US008674529B2

(12) United States Patent
Takita

(10) Patent No.: US 8,674,529 B2
(45) Date of Patent: Mar. 18, 2014

(54) COGENERATION APPARATUS

(75) Inventor: Yoshiharu Takita, Wako (JP)

(73) Assignee: Honda Motor Co., Ltd, Tokyo (JP)

( * ) Notice: Subject to any disclaimer, the term of this patent is extended or adjusted under 35 U.S.C. 154(b) by 142 days.

(21) Appl. No.: 13/275,745

(22) Filed: Oct. 18, 2011

(65) Prior Publication Data
US 2012/0126537 A1 May 24, 2012

(30) Foreign Application Priority Data

Nov. 19, 2010 (JP) .................................. 2010-259320

(51) Int. Cl.
F02B 63/04 (2006.01)

(52) U.S. Cl.
USPC ............................................. 290/1 A; 123/2

(58) Field of Classification Search
USPC ........ D13/101, 112, 114, 118, 122, 184, 199; 290/1 A, 1 R; 219/133; 123/2
See application file for complete search history.

(56) References Cited

U.S. PATENT DOCUMENTS

| | | | | |
|---|---|---|---|---|
| 4,226,214 A | * | 10/1980 | Palazzetti | 123/2 |
| 4,495,901 A | * | 1/1985 | Nannini et al. | 123/2 |
| 4,835,405 A | | 5/1989 | Clancey et al. | |
| D308,854 S | * | 6/1990 | Fuhrmann et al. | D13/184 |
| 5,433,175 A | * | 7/1995 | Hughes et al. | 123/2 |
| 5,804,946 A | * | 9/1998 | Gaubatz et al. | 322/1 |
| 5,899,174 A | | 5/1999 | Anderson et al. | |
| 2005/0155559 A1 | | 7/2005 | Chosei | |

FOREIGN PATENT DOCUMENTS

| | | |
|---|---|---|
| JP | 11-200951 A | 7/1999 |
| JP | 2005-233030 A | 9/2005 |
| JP | 2010-106726 A | 5/2010 |
| WO | 95/15432 A1 | 6/1995 |
| WO | 2010/050481 A1 | 5/2010 |

OTHER PUBLICATIONS

Extended European Search Report dated Apr. 27, 2012, issued in corresponding European Patent Application No. 11189518.1.(7 pages).
Japanese Office Action dated Sep. 24, 2013, issued in corresponding Japanese Patent Application No. 2010-259320, w/partial English translation.

* cited by examiner

Primary Examiner — Renee Luebke
Assistant Examiner — Neil J Onifer
(74) Attorney, Agent, or Firm — Westerman, Hattori, Daniels & Adrian, LLP

(57) ABSTRACT

A cogeneration apparatus includes a housing for accommodating an engine, a fuel line, an electrical generator, and a power converter part. The housing is partitioned into a power-generation compartment and an electrical-equipment compartment. Empty space in the housing is used to form a concave part, which is indented from the electrical-equipment compartment toward the power-generation compartment. The fuel line is disposed in the concave part.

3 Claims, 13 Drawing Sheets

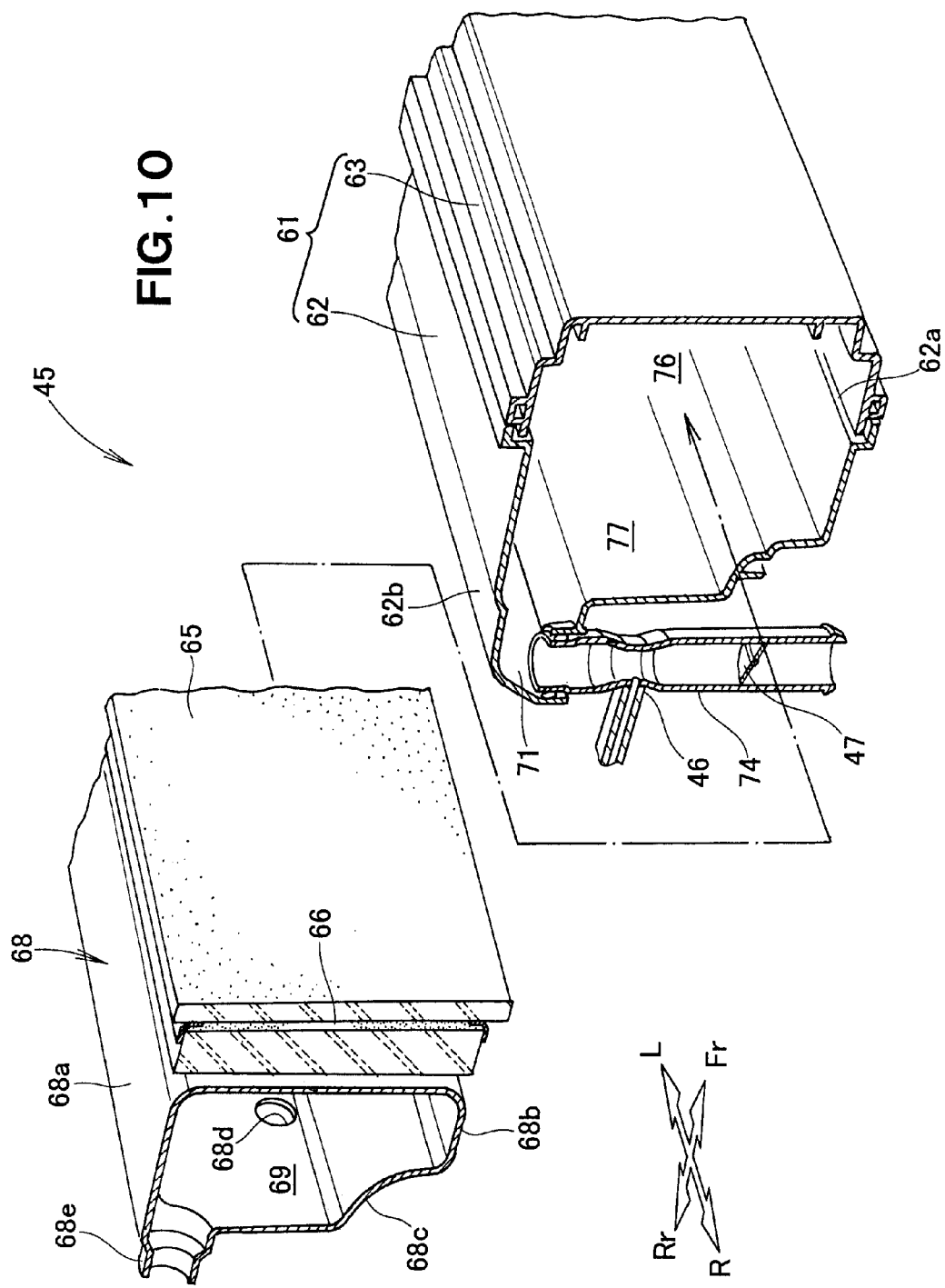

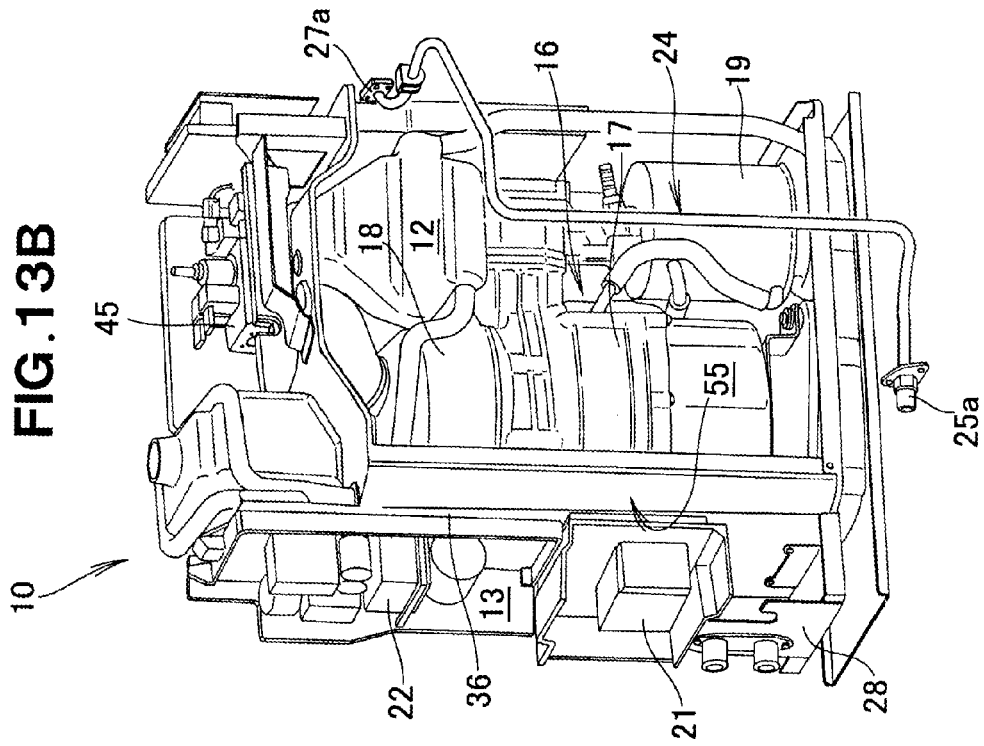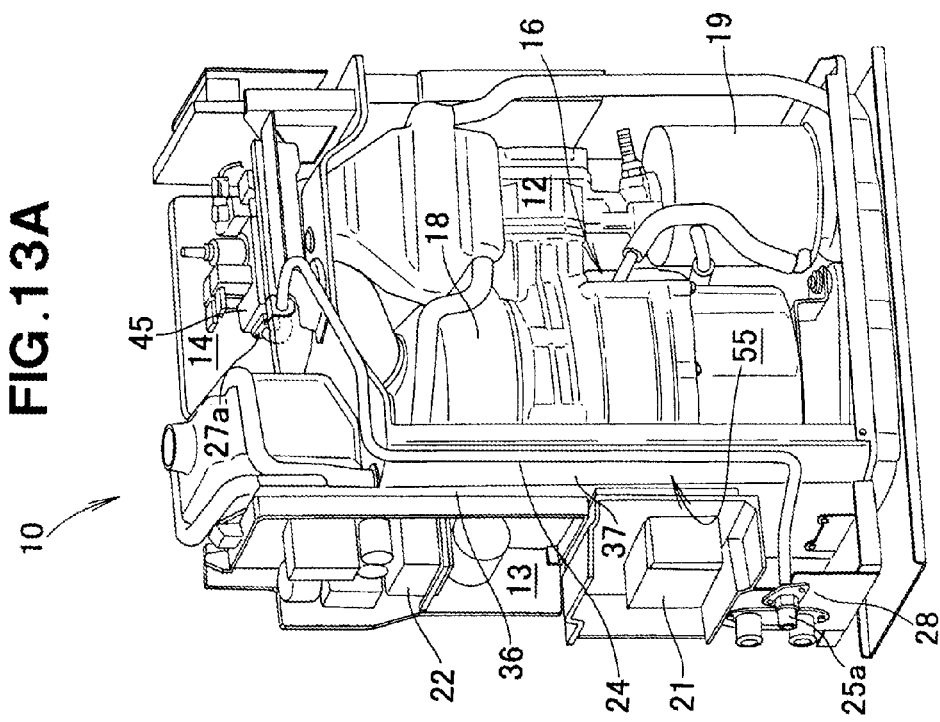

COGENERATION APPARATUS

FIELD OF THE INVENTION

The present invention relates to a cogeneration apparatus including a fuel line for leading fuel to a motor, a control part for controlling the motor, an electrical generator driven by the motor, and a power-converting part for converting alternating-current electrical power produced by the electrical generator, which are accommodated within a housing.

BACKGROUND OF THE INVENTION

Disclosed in Japanese Patent Application Laid-Open Publication No. H11-200951 (JP-A H11-200951) is a well-known example of a cogeneration apparatus in which a gas-line chamber is partitioned from an engine-accommodating chamber, whereby fuel gas within a gas line is not affected by heat produced by an engine.

In this cogeneration apparatus, a gas engine is used as a motor, a gas line is provided for supplying fuel gas to the gas engine, a housing for accommodating the gas engine and the gas line is partitioned into the engine-accommodating chamber and the gas-line chamber, and the gas line, a gas shutoff valve, and a gas regulator are accommodated in the gas-line chamber.

However, in the cogeneration apparatus disclosed in JP-A H11-200951, the gas-line chamber is partitioned off within the housing, and the gas-line chamber must be comparatively large in order to accommodate all of the gas line, the gas shutoff valve, the gas regulator, and the like in the gas-line chamber. The size of the housing therefore increases, and the cogeneration apparatus is prevented from being downsized.

SUMMARY OF THE INVENTION

It is an object of the present invention to provide a cogeneration apparatus in which the effects of the heat of a motor on fuel gas are limited, and which can be downsized.

According to one aspect of the present invention, there is provided a cogeneration apparatus which comprises: a motor; a fuel line for leading fuel to the motor; a control part for controlling the motor; an electrical generator driven by the motor; a power converter part for converting alternating-current power generated by the electrical generator to electrical power of required specification; a heat exchanger for using waste heat of the motor as a heat source; and a housing for accommodating the motor, the fuel line, the control part, the electrical generator, the power converter part, and the heat exchanger, wherein the housing is partitioned into a power-generation compartment and an electrical-equipment compartment, the motor, the electrical generator, and the heat exchanger being accommodated in the power-generation compartment, while the control part, the power converter part, and the fuel line being accommodated in the electrical-equipment compartment, the housing has a concave part formed by depressing an empty space thereof toward the electrical-equipment compartment, and the fuel line is disposed in the concave part.

The fuel line is therefore disposed in the electrical-equipment compartment, and therefore the heat produced by the motor does not affect the fuel gas flowing within the fuel line.

The empty space (dead space) of the housing is used to form the concave part, whereby more space need not be secured for forming the concave part in the housing. The housing can thereby be limited to a small size, and the cogeneration apparatus can be downsized.

Preferably, the concave part is provided adjacent to a wall surface of the housing. The control part, the power converter part, and other electronic components are provided to the electrical-equipment compartment. The fuel line must therefore be removed when attaching and detaching or when maintaining and checking the control part, the power converter part, or other electronic components. However, removing the fuel line requires significant labor when the fuel line is disposed toward the interior of the housing, and attaching and detaching or maintaining and checking the electronic components therefore also requires significant labor. The concave part is accordingly provided adjoining the wall surface of the housing. The fuel line can therefore be readily removed without requiring significant labor, and attaching and detaching or maintaining and checking the control part, the power converter part, or other electronic components can be accomplished without significant labor. The ease of assembly and maintainability (maintenance and suitability for inspection) of the cogeneration apparatus can therefore be improved.

Desirably, the concave part is formed to have a substantially triangular shape when viewed from above. One side of the triangular concave part can therefore double as the wall surface, and the other sides allow the dividing wall to be kept small.

The other sides of the substantially triangular concave part can be formed using a simple configuration in which the dividing wall of the electrical-equipment compartment is merely bent at one location. The dividing wall of the electrical-equipment compartment that forms the triangular concave part can thus be limited to a small size. The simple configuration in which the dividing wall of the electrical-equipment compartment is merely bent at one location also allows costs to be reduced.

BRIEF DESCRIPTION OF THE DRAWINGS

A preferred embodiment of the present invention will be described in detail below, by way of example only, with reference to the accompanying drawings, in which

FIG. 10 is an exploded perspective view showing the air-cleaning device of FIG. 9;

FIGS. 13A and 13B are schematic view illustrating an example manner of attachment/detachment and maintenance/checking of an electronic component of the cogeneration apparatus according to the present invention.

DETAILED DESCRIPTION OF THE PREFERRED EMBODIMENTS

Figure 1:
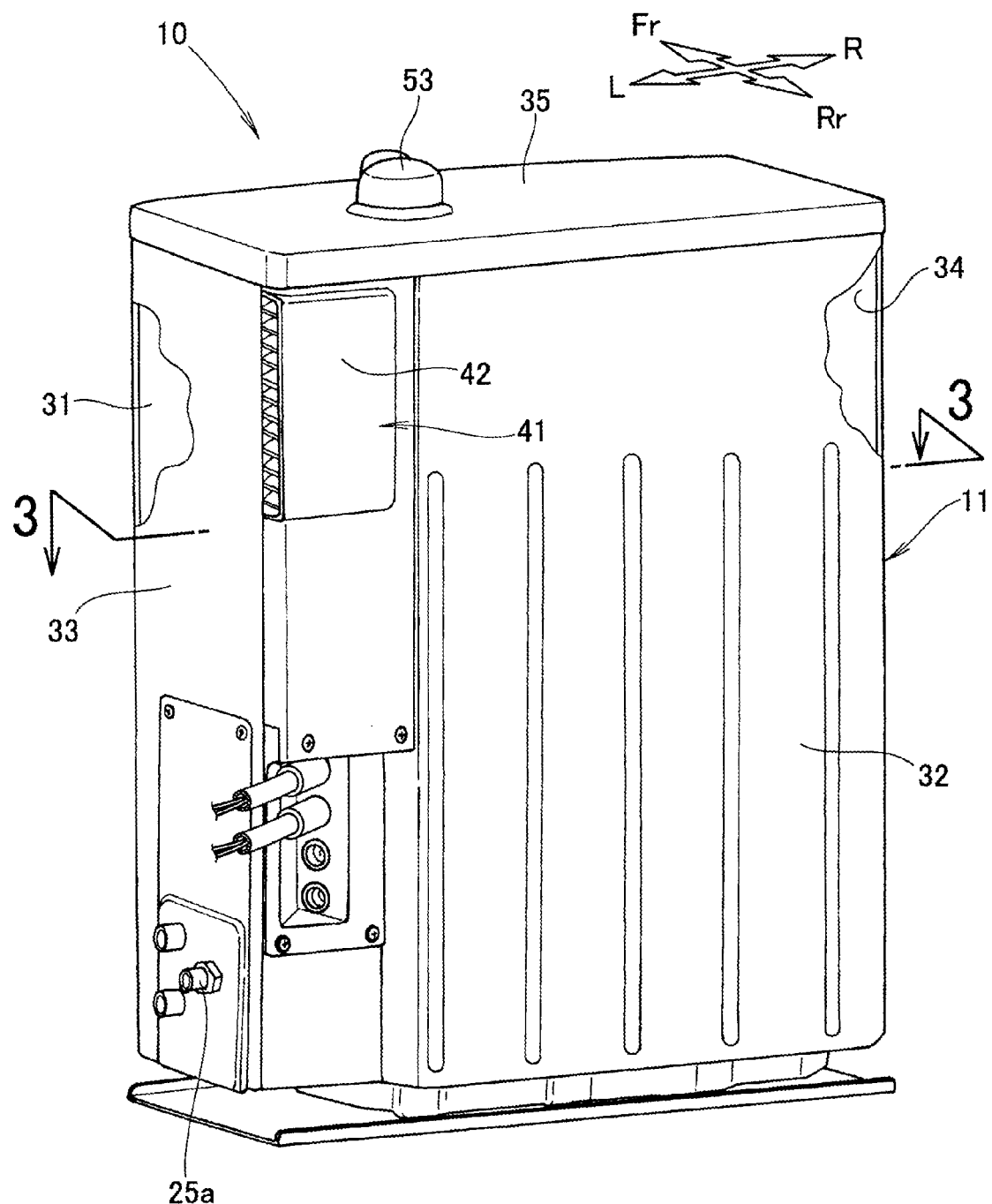
FIG. 1 is a perspective view illustrating a cogeneration apparatus according to an embodiment of the present invention, as seen from the rear.

In the description of the present embodiment, "front," "rear," "left," and "right" are shown as "Fr," "Rr," "L," and "R." in the drawings.

Figure 2:
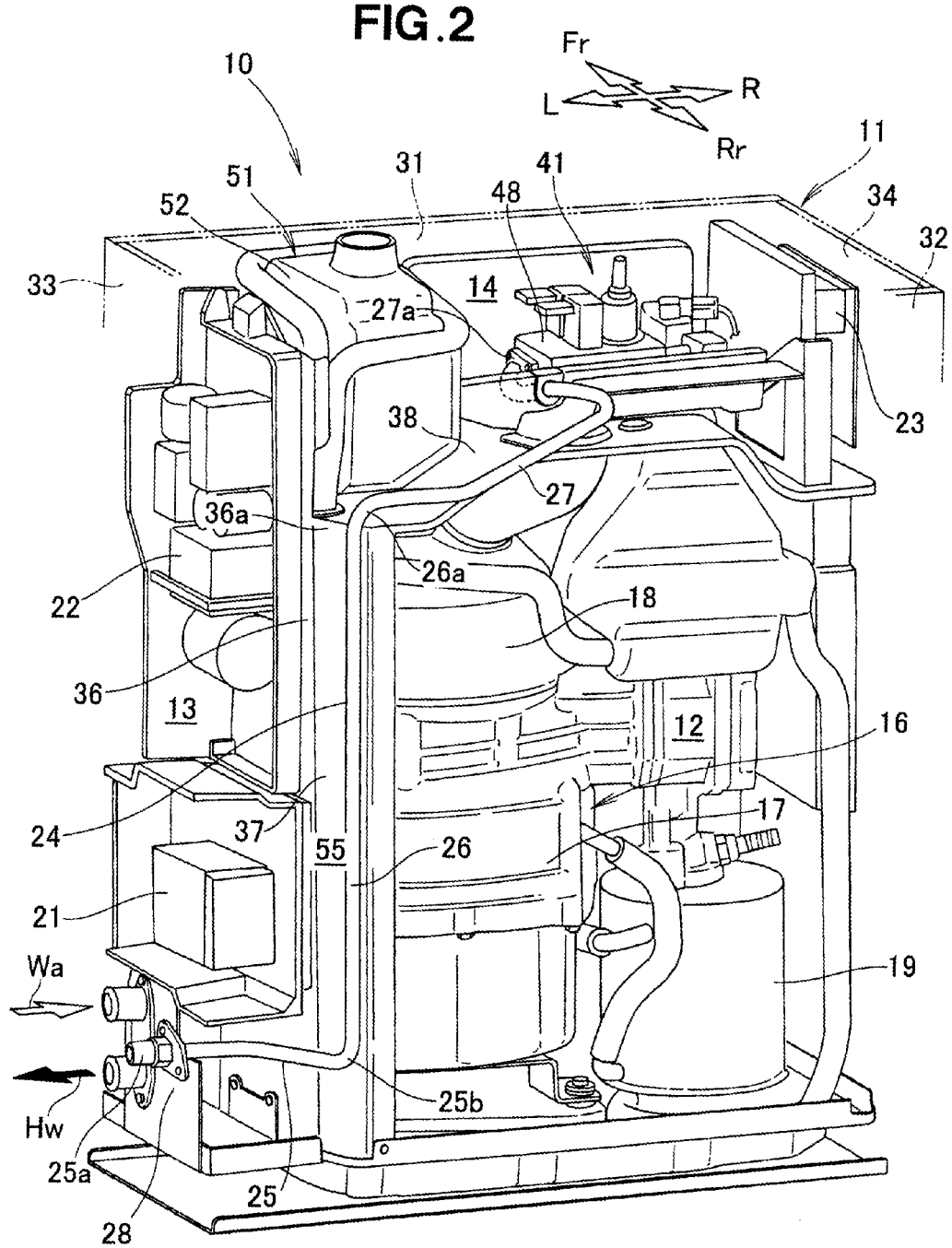
FIG. 2 is a perspective view showing the cogeneration apparatus of FIG. 1, an outside panel removed.

As shown in FIGS. 1 and 2, a cogeneration apparatus 10 according to the present embodiment is a combined heat-and-power apparatus that is provided with a cogeneration case (housing) 11 partitioned into a power-generation compartment 12 and an electrical-equipment compartment 13; an engine (motor) 16 accommodated in a lower part inside the power-generation compartment 12; an electrical generator 18 provided to an upper part of a body (referred to as "engine body" below) 17 of the engine 16; a heat exchanger 19 provided to the side of the engine body 17; a first control part (control part) 21 accommodated in a lower part inside the electrical-equipment compartment 13; a power converter part 22 accommodated in an upper part inside the electrical-equipment compartment 13; and an internal fuel line (fuel line) 24 accommodated within the electrical-equipment compartment 13.

The cogeneration case 11 is formed into a substantially rectangular shape by a front panel 31, a rear panel 32, a left side panel 33, a right side panel 34, and a roof panel 35. A dividing wall 36 (see FIG. 3) is provided along the left side panel 33 within the cogeneration case 11. An upper dividing part 38 is provided to extend from an upper end part 36a of the dividing wall 36 to the right side panel 34.

Providing the dividing wall 36 within the cogeneration case 11 allows the space within the cogeneration case 11 to be partitioned into left and right spaces for the power-generation compartment 12 and the electrical-equipment compartment 13. The power-generation compartment 12 on the right accommodates the engine 16, the electrical generator 18, the heat exchanger 19, and the like. The electrical-equipment compartment 13 on the left accommodates the first control part 21, the power converter part (inverter unit) 22, the internal fuel line 24, and the like.

Providing the upper dividing part 38 within the cogeneration case 11 allows the upper region of the power-generation compartment 12 to be partitioned into spaces for an intake/exhaust part 14. In the intake/exhaust part 14 is accommodated (disposed) an air-cleaning device 45 (see FIG. 4), a gas-flow-adjusting device 48, and a mixer 46 (including a throttle valve 47 shown in FIG. 9). The air-cleaning device constitutes a part of an intake system 41 of the engine 16. In the intake/exhaust part 14 is also accommodated (disposed) a muffler 52 that constitutes a part of an exhaust system 51 of the engine 16. The muffler 52 is communicatingly connected to an exhaust outlet 53.

Figure 3:
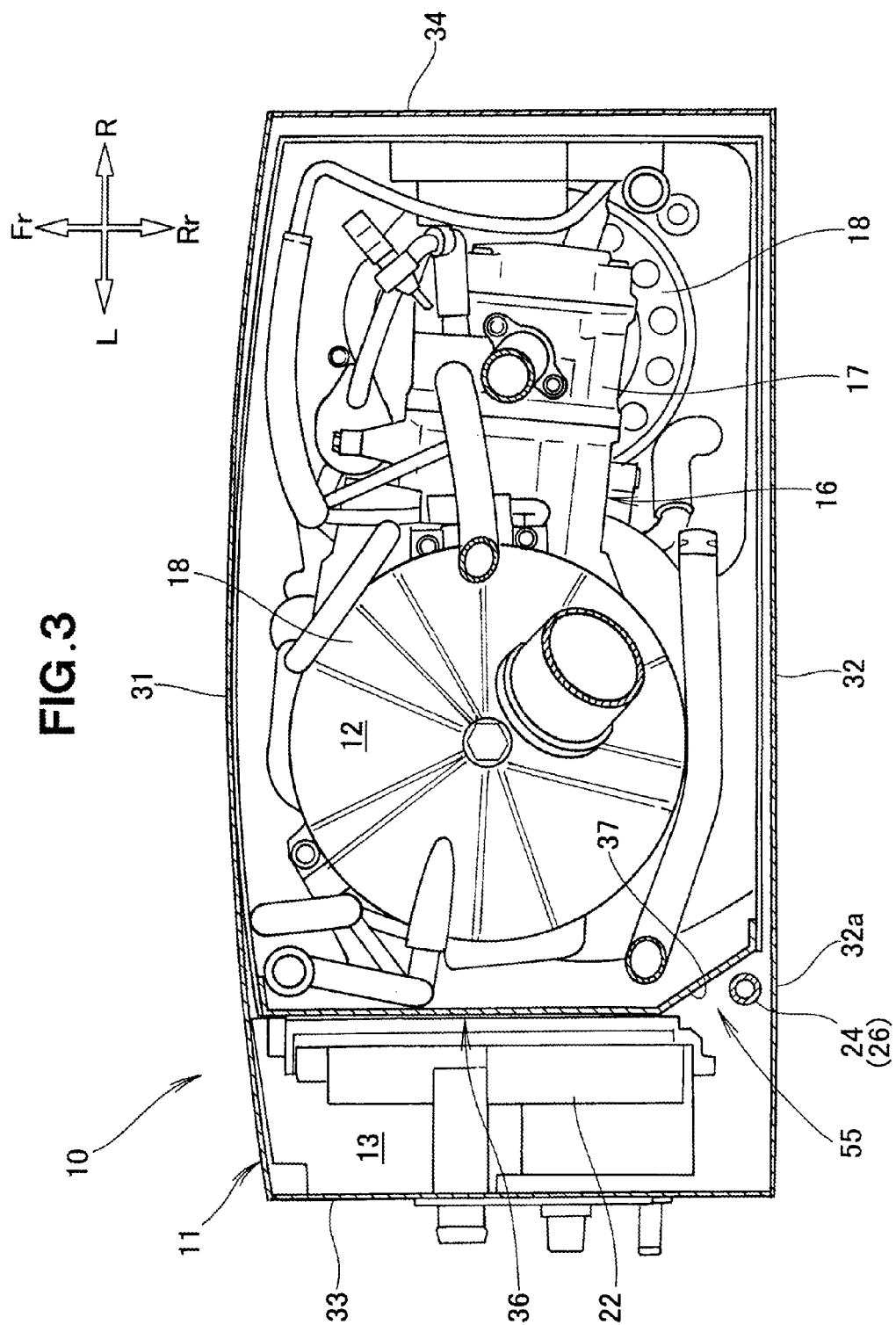
FIG. 3 is a cross-sectional view taken along line 3-3 of FIG. 1.

As shown in FIGS. 2 and 3, the dividing wall 36 has a rear bent part 37 that is bent towards empty space ("dead space") in the power-generation compartment 12. The rear bent part 37 is provided to the rear end of the dividing wall 36 and is provided adjoining the rear panel (wall surface) 32. A concave part 55 is formed by the rear bent part 37 and the rear panel 32. In other words, the concave part 55 is a space adjoining the rear panel 32 and is formed by the rear bent part 37 and the rear panel 32 in a substantially triangular shape when viewed from above. The concave part 55 that is depressed from the electrical-equipment compartment 13 toward the power-generation compartment 12 is thus formed in the electrical-equipment compartment 13 using the empty space of the cogeneration case 11, or, specifically, using the empty space of the power-generation compartment 12. The internal fuel line 24 is disposed within the concave part 55.

Thus, the cogeneration case 11 is partitioned into the power-generation compartment 12 and the electrical-equipment compartment 13, the concave part 55 is formed to be depressed from the electrical-equipment compartment 13 toward the power-generation compartment 12, and the internal fuel line 24 is disposed in the concave part 55. The internal fuel line 24 can thereby be disposed in the electrical-equipment compartment 13, and therefore the heat produced by the engine 16 does not affect the fuel gas (fuel) flowing within the internal fuel line 24.

The empty space ("dead space") of the cogeneration case 11 is used to form the concave part 55, whereby more space need not be secured for forming the concave part 55 in the cogeneration case 11. The cogeneration case 11 can thereby be limited to a small size, and the cogeneration apparatus 10 can be downsized.

The concave part 55 is provided adjoining the rear panel 32 of the cogeneration case 11 and is formed having a substantially triangular shape when viewed from above. One side of the substantially triangular concave part 55 can therefore double (be formed as) a part 32a of the rear panel 32, and the other sides can be formed by the dividing wall 36 (specifically, the rear bent part 37) of the electrical-equipment compartment 13. The dividing wall 36 of the electrical-equipment compartment 13 that forms the substantially triangular concave part 55 can therefore be kept small.

The other sides of the substantially triangular concave part 55 can be formed using a simple configuration in which the rear bent part 37 of the dividing wall 36 is merely bent at one location. The rear bent part 37 of the dividing wall 36 that forms the substantially triangular concave part 55 can thus be limited to a small size. The simple configuration in which the rear bent part 37 of the dividing wall 36 is merely bent at one location also allows the cost of the cogeneration apparatus 10 to be reduced.

Figure 4:
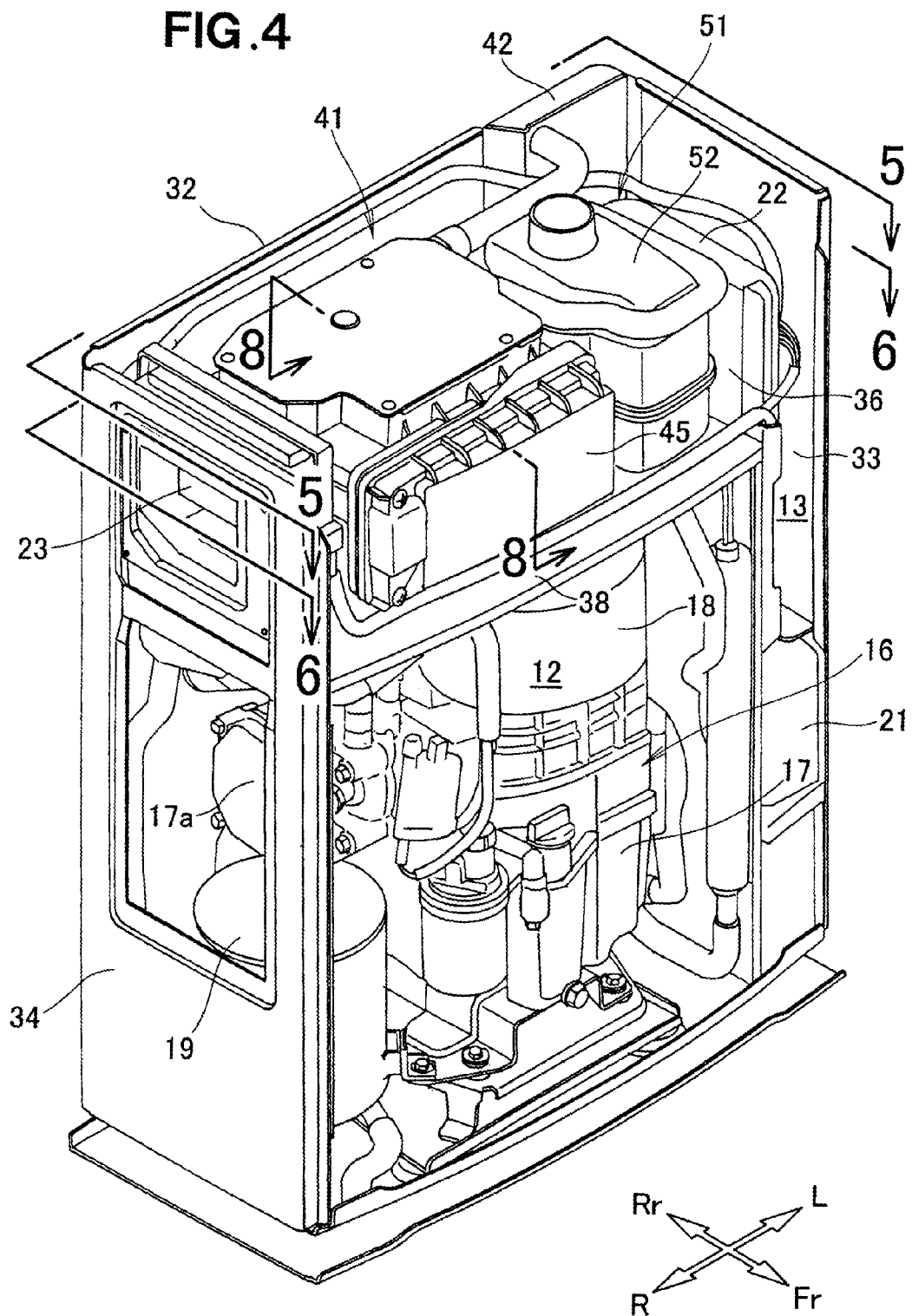
FIG. 4 is a perspective view showing the cogeneration apparatus of FIG. 1, as seen from the front.
Figure 5:
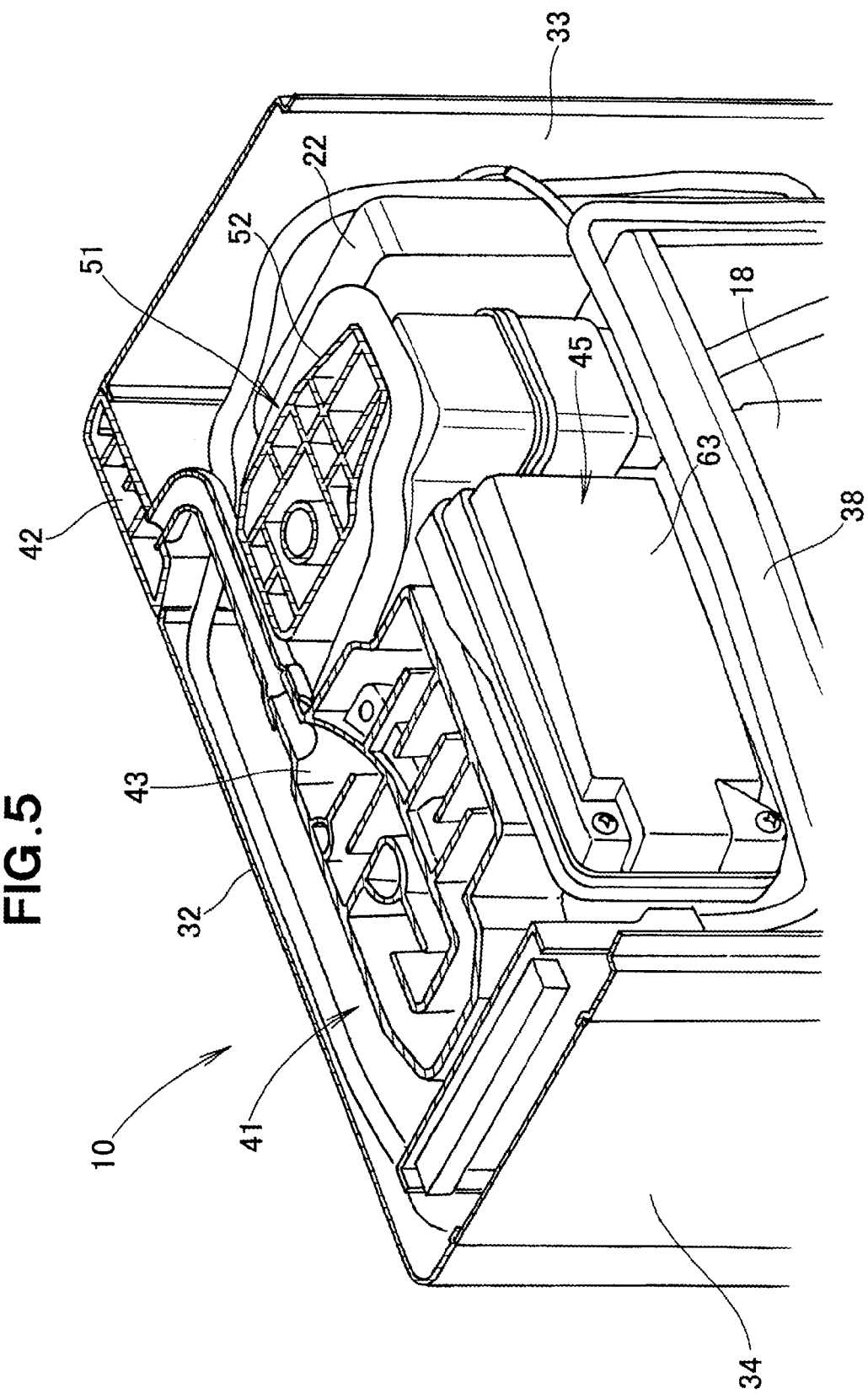
FIG. 5 is a cross-sectional view taken along line 5-5 of FIG. 4.
Figure 6:
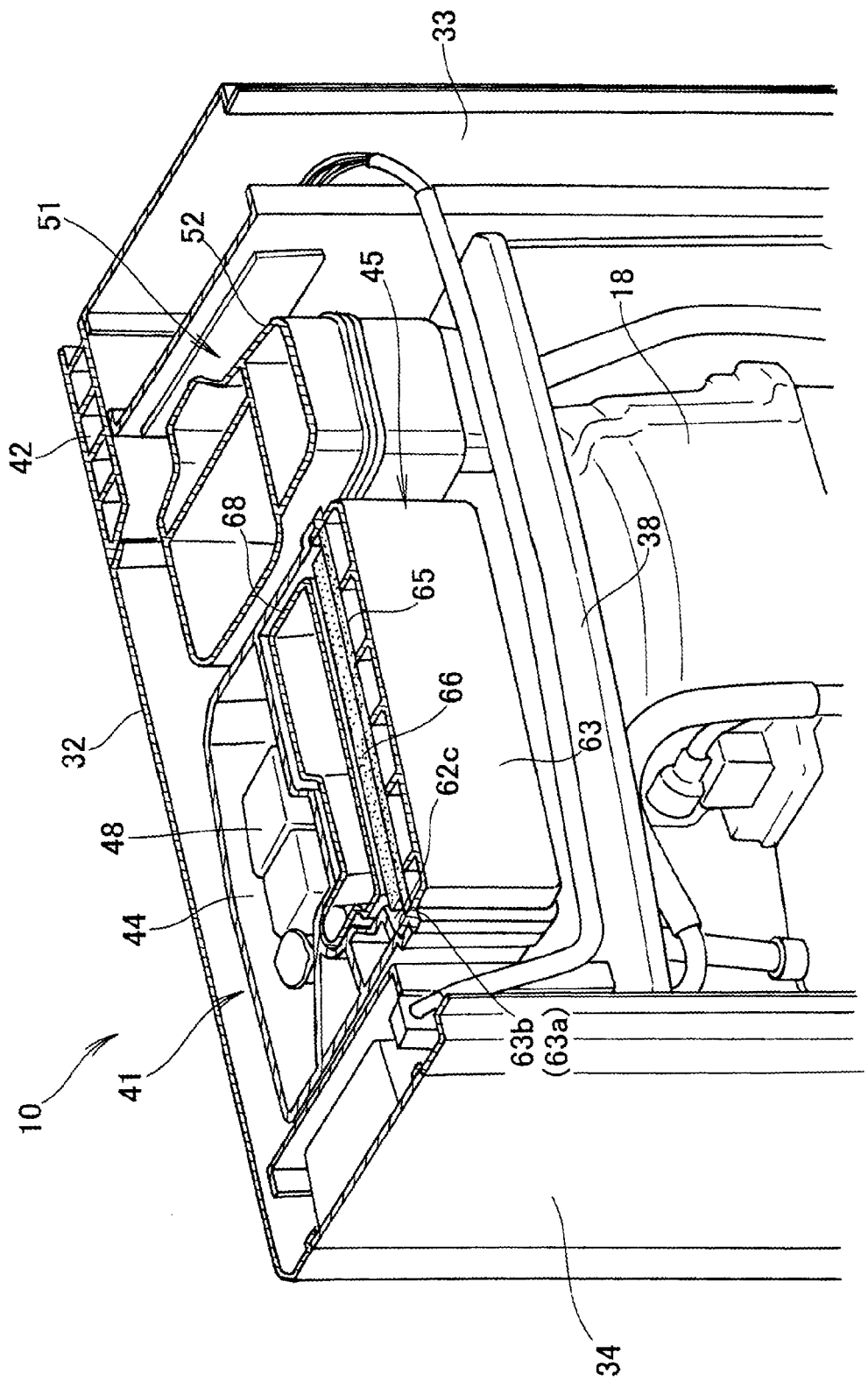
FIG. 6 is a cross-sectional view taken along line 6-6 of FIG. 4.

As shown in FIGS. 4, 5, and 6, the engine 16 is a gas engine that is provided with an air-intake part 42 provided to the intake system 41; the air-cleaning device 45 provided downstream of the air-intake part 42; a gas-flow-adjusting device 48 provided downstream of the air-cleaning device 45, the mixer 46 (see FIG. 7) provided downstream of the gas-flow-adjusting device 48; and the throttle valve 47 (see FIG. 8) included in the mixer.

According to the intake system 41, air (outside gas) taken in from the air-intake part 42 is led to the air-cleaning device 45 through a first air-introducing channel 43 and a second air-introducing channel 44. The first air-introducing channel 43 is formed having a labyrinthine shape. The air that is led to the air-cleaning device 45 is cleaned by the air-cleaning device 45, and cleaned air is mixed with the fuel gas in the mixer 46. The mixed fuel gas is introduced through the throttle valve 47 (FIG. 7) into a combustion chamber 17a of the engine 16, and the engine 16 is driven.

As shown in FIG. 4, the electrical generator 18 is provided to the upper part of the engine body 17, and a drive shaft of the electrical generator 18 is coaxially linked to a crankshaft of the engine 16. Driving the electrical generator 18 using the engine 16 allows electrical power (alternating-current electrical power) to be produced by the electrical generator 18.

In the heat exchanger 19, water is brought in from the outside as shown by the arrow Wa (FIG. 2), along with exhaust gas of the engine 16. Heat exchange occurs between the exhaust gas and the water, thereby heating the water. The waste heat (exhaust heat) of the engine 16 is thus used as a heat source to generate hot water, and the heat of the hot water generated is brought to the outside of the cogeneration apparatus 10 as shown by the arrow Hw (FIG. 2) and used for space heating or the like.

As shown in FIG. 2, the first control part 21 is provided to substantially the lower-half part of the dividing wall 36 and is thereby disposed within the electrical-equipment compartment 13. The first control part 21 is, e.g., an earth leakage circuit breaker, but this example is not given by way of limitation; other engine-controlling functions may be provided.

The cogeneration apparatus 10 is provided with a second control part 23 on the right of the air-cleaning device 45 (intake/exhaust part 14). The second control part 23 is an ECU provided with functions for, e.g., controlling the engine 16 so that the electrical generator 18 is switched to a starter function when starting the engine 16, and the electrical generator 18 is switched to the generator function after starting the engine 16. As long as the second control part 23 is not disposed in the power-generation compartment 12, the space in which the second control part is placed is not limited, and the second control part may therefore also be disposed in the electrical-equipment compartment 13.

The power converter part 22 is provided to the upper-half part of the dividing wall 36 and is thereby disposed in the electrical-equipment compartment 13. The power converter part 22 is an inverter unit for converting the alternating-current electrical power produced by the electrical generator 18 into electrical power of the required specifications.

Figure 7:
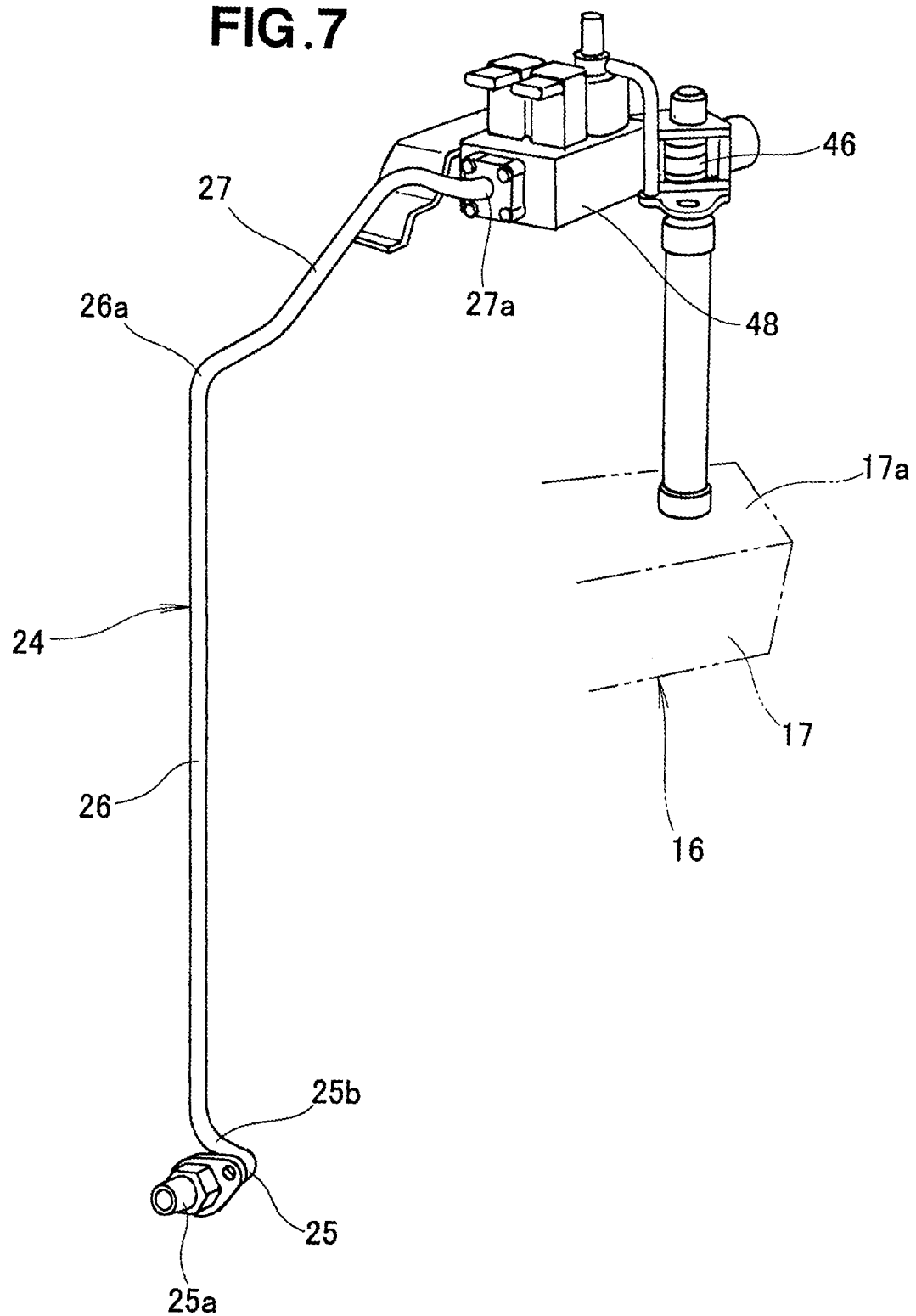
FIG. 7 is a perspective view showing a relationship between the internal fuel line and the mixer.

As shown in FIGS. 2 and 7, in the internal fuel line 24, a panel end part 25a is provided to a supporting bracket 28 near the left side panel 33, and a gas-flow-adjusting end part 27a is provided to the gas-flow-adjusting device 48. The panel end part 25a is on the upstream side of the internal fuel line 24, and the gas-flow-adjusting end part 27a is on the downstream of the internal fuel line 24. The internal fuel line 24 has a lower horizontal line part 25 and a vertical line part 26 accommodated in the electrical-equipment compartment 13; and an upper inclined line part 27 accommodated in the intake/exhaust part 14.

The panel end part 25a is provided to the left side panel 33, and the lower horizontal line part 25 extends substantially horizontally from the panel end part 25a to the rear bent part 37. The lower horizontal line part 25 is accommodated in the electrical-equipment compartment 13. The panel end part 25a is communicatingly connected through an external fuel line to a fuel-gas supply source outside the cogeneration apparatus 10.

The vertical line part 26 extends from a bent-part end 25b of the lower horizontal line part 25 upwards along the rear bent part 37 to the upper dividing part 38. The vertical line part 26 is accommodated in the electrical-equipment compartment 13 (specifically, in the concave part 55; see FIG. 3).

The upper inclined line part 27 extends from an upper end 26a of the vertical line part 26 to the gas-flow-adjusting device 48. The gas-flow-adjusting end part 27a is communicatingly connected with the gas-flow-adjusting device 48. The upper inclined line part 27, which is communicatingly connected with the gas-flow-adjusting device 48, is accommodated in the intake/exhaust part 14. Communication of the upper inclined line part 27 to the gas-flow-adjusting device 48 thus enables the gas-flow-adjusting device 48 to communicate with the fuel-gas supply source via the internal fuel line 24 and the external fuel line.

The fuel gas (fuel) of the fuel-gas supply source can therefore be supplied through the external fuel line and the internal fuel line 24 to the gas-flow-adjusting device 48. The flow rate of the fuel gas that is supplied to the gas-flow-adjusting device 48 is adjusted by the gas-flow-adjusting device 48, and the fuel gas is led to the mixer 46 (FIG. 7). The fuel gas that is led to the mixer 46 is mixed with air led from the air-cleaning device 45. The fuel gas mixed in the mixer 46 is introduced through the throttle valve 47 (FIG. 7) into the combustion chamber 17a of the engine 16.

Figure 8:
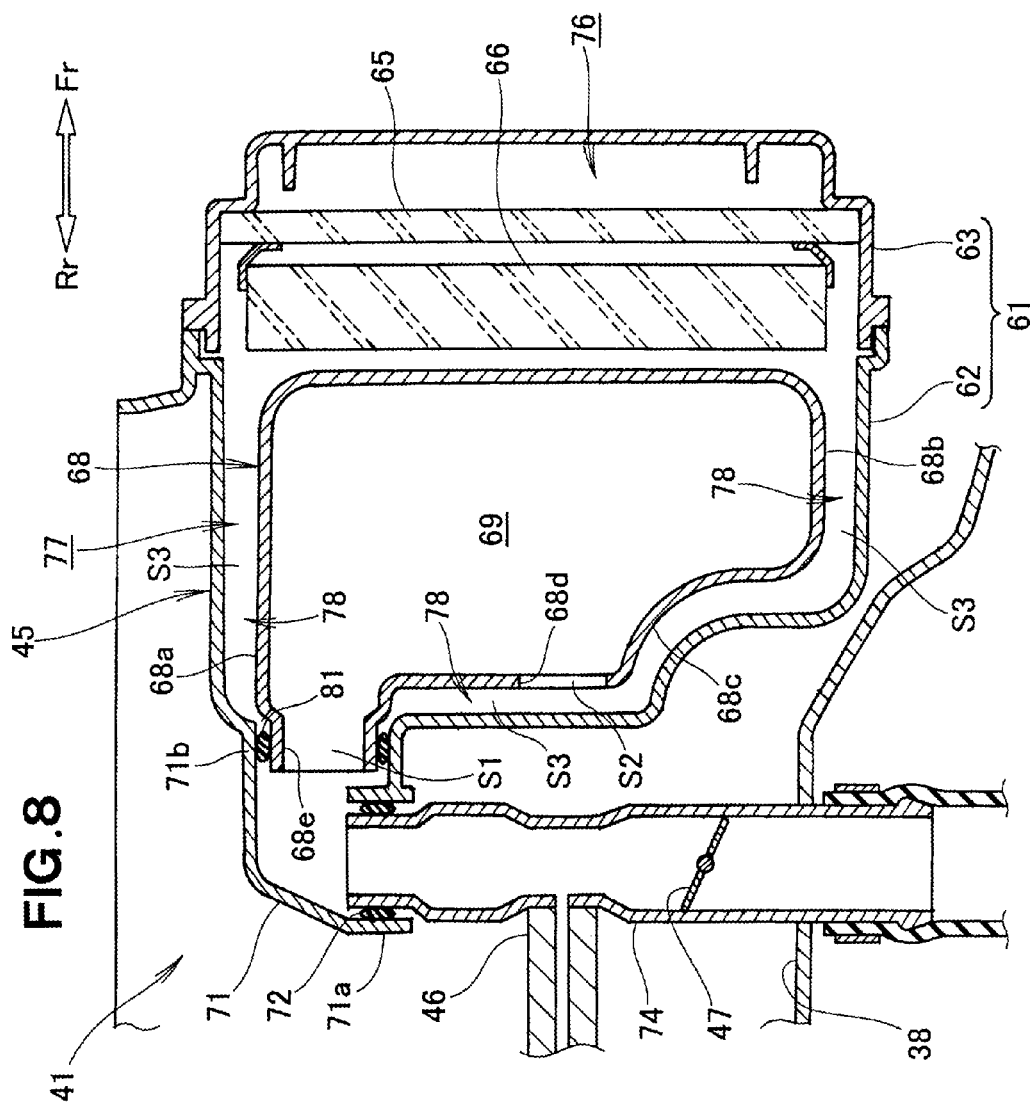
FIG. 8 is a cross-sectional view taken along line 8-8 of FIG. 4.

As shown in FIG. 8, the air-cleaning device 45 is provided with an air-cleaning case 61 that is communicatingly connected to the intake system 41; a first air filter 65 and a second air filter (air filter) 66 that are accommodated within the air-cleaning case 61; and a hollow resonator 68 that is provided downstream of the second air filter 66.

Figure 9:
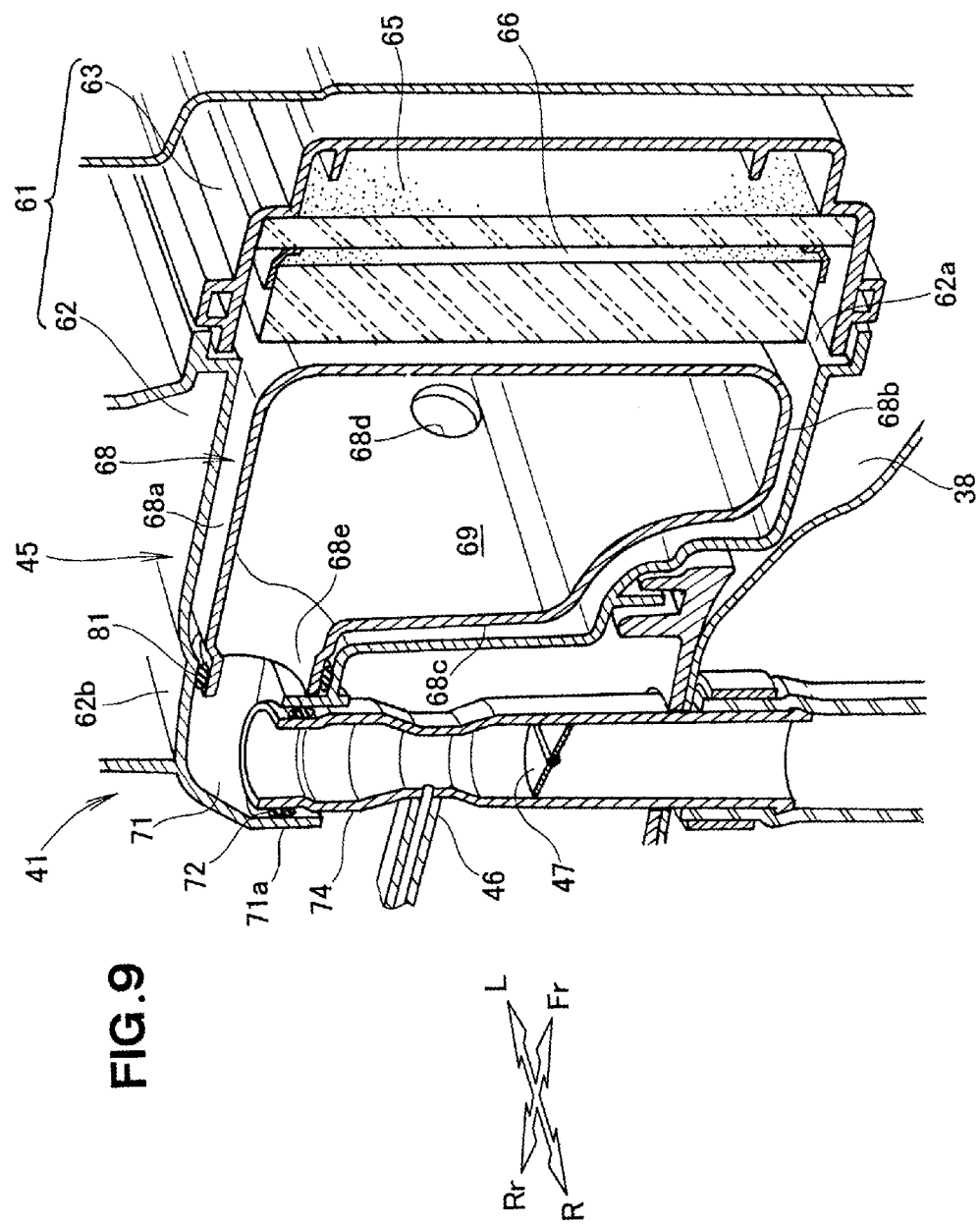
FIG. 9 is a perspective view showing an air-cleaning device of FIG. 8.

As shown in FIGS. 9 and 10, the air-cleaning case 61 is provided with a box-shaped case body 62 that is communicatingly connected to the mixer 46, and a cover 63 that is detachably provided to an aperture part 62a of the case body 62.

In the case body 62, a communicatingly-connecting channel 71 is formed on a rear end part 62b, and an outer end part 71a of the communicatingly-connecting channel 71 is communicatingly connected to an introduction line 74 of the intake system 41 via a seal material 72. An air-intake port 62c (see FIG. 6) that is communicatingly connected to the second air-introducing channel 44 (FIG. 6) is formed in the case body 62.

As shown in FIG. 6, the cover 63 accommodates the first air filter 65 and the second air filter 66 in a state of attachment to the aperture part 62a of the case body 62. In the cover 63, a right end part 63b on an aperture part 63a of the cover 63 is communicatingly connected to the air-intake port 62c of the case body 62. The second air filter 66 is provided downstream of the first air filter 65, i.e., toward the resonator 68.

As shown in FIG. 8, the second air filter 66 is provided at a position where the space within the air-cleaning case 61 splits into an upstream space 76 and a downstream space 77. The upstream space 76 is formed inside the cover 63, and the downstream space 77 is formed in the case body 62. The upstream space 76 is communicatingly connected to the air-intake port 62c (FIG. 6) of the case body 62. The downstream space 77 is formed downstream of the upstream space 76. The upstream space 76 and the downstream space 77 are communicatingly connected via the second air filter 66.

According to the air-cleaning device 45, air that has passed through the second air-introducing channel 44 (FIG. 6) of the intake system 41 is led upstream of the first air filter 65, in the upstream space 76. The air that has been led upstream of the first air filter 65 is purified by the first air filter 65 and led toward the second air filter 66. The air that has been led toward the second air filter 66 is purified by the second air filter 66 and led to the downstream space 77.

The hollow resonator 68 is positioned in the downstream space 77. The resonator 68 is formed in a box shape that has a substantially rectangular cross section, and is a sound-deadening part (silencer) for introducing air from the downstream space 77 into an internal space 69 and thereby limiting the intake noise of the air. The resonator 68 is provided to the downstream space 77 and is positioned at a predetermined interval with respect to the air-cleaning case 61.

Positioning the resonator 68 at a predetermined interval with respect to the air-cleaning case 61 allows a downstream-space channel 78 to be formed between the resonator 68 and the air-cleaning case 61. In other words, the downstream-space channel 78 can be ensured along an upper outside wall 68a, a lower outside wall 68b, and a rear outside wall 68c of the resonator 68. The downstream-space channel 78 can be used as a channel for introducing air into the resonator 68.

The downstream-space channel 78 is formed having a cross-sectional area S3. The downstream-space channel 78 is usually formed between the resonator 68 and the air-cleaning case 61, and therefore preserving a uniform cross-sectional area is difficult. The minimum cross-sectional area of the downstream-space channel 78 will therefore be given as the cross-sectional area S3.

The aforedescribed resonator 68 has an introduction port 68d for communicatingly connecting the downstream-space channel 78 to the hollow internal space 69, and a lead-out port 68e for communicatingly connecting the hollow internal space 69 to the introduction line 74 of the intake system 41.

The introduction port 68d is provided to the side opposite (i.e., far from) the second air filter 66. The introduction port 68d is formed having a cross-sectional area S2. Providing the introduction port 68d to the side opposite the second air filter 66 thus enables the intake noise of the engine 16 that is produced accompanying intake pulsations and shock waves to be led through the internal space 69 of the resonator 68 and then to the downstream-space channel 78. The intake noise of the engine 16 can thereby be minimized by the resonator 68 and then further minimized by the downstream-space channel 78.

The introduction port 68d is communicatingly connected via a seal material 81 to an inside end part 71b of the communicatingly-connecting channel 71 provided to the case body 62. The seal material 81 interrupts the communicating connection between the downstream-space channel 78 and the communicatingly-connecting channel 71. The lead-out port 68e is provided above the introduction port 68d and on the same side as the introduction port 68d, and is positioned upstream of the throttle valve 47. The lead-out port 68e is formed having a cross-sectional area S1.

Accommodating the resonator 68 in the downstream space 77 within the air-cleaning case 61 allows the introduction port 68d and the lead-out port 68e provided to the resonator 68 to be positioned within the air-cleaning case 61. The seals at the connecting part of the introduction port 68d and the connecting part of the lead-out port 68e therefore need not be excessively enhanced in comparison to the case in which the resonator 68 is provided outside the air-cleaning case 61. Manufacturing is thereby simplified, and the cost of the cogeneration apparatus 10 can be reduced.

The relationship between the cross-sectional area S1 of the lead-out port 68e, the cross-sectional area S2 of the introduction port 68d, and the cross-sectional area S3 of the downstream-space channel 78 will now be described. Specifically, the cross-sectional area S1 of the lead-out port 68e and the cross-sectional area S2 of the introduction port 68d have a relationship such that S1>S2.

The relationship S1>S2 thus allows the internal space 69 of the resonator 68 upstream of the throttle valve 47 to have a negative pressure during intake of the engine 16 (FIG. 2). The throttle valve 47 thereby tends to be open, and the engine 16 can be efficiently driven. The cross-sectional area S2 of the introduction port 68d is kept small, whereby the intake noise can be suitably reduced by the internal space 69 of the resonator 68, and accordingly the intake noise of the engine 16 can be more favorably reduced (minimized).

The cross-sectional area S3 of the downstream-space channel 78 and the cross-sectional area S2 of the introduction port 68d have a relationship such that S3>S2. When, e.g., the cross-sectional area S3 of the downstream-space channel 78 and the cross-sectional area S2 of the introduction port 68d have a relationship such that S3<S2, the narrowest point of air entry (minimum cross-sectional view) into the engine 16 is the cross-sectional area S3 of the downstream-space channel 78. The downstream-space channel 78 is the channel formed by the interval between the resonator 68 and the air-cleaning case 61. The air in the downstream-space channel 78 could therefore have difficulty in flowing stably in cases where the cross-sectional area S3 of the downstream-space channel 78 is kept small.

Stably driving the engine 16 may therefore be difficult, and intake noise may increase. The cross-sectional area S3 of the downstream-space channel 78 is accordingly kept large, where the relationship between the cross-sectional area S3 of the downstream-space channel 78 and the cross-sectional area S2 of the introduction port 68d is such that S3>S2. The intake noise of the engine 16 can thereby be more favorably reduced (minimized).

The cross-sectional area S3 of the downstream-space channel 78 and the cross-sectional area S1 of the lead-out port 68e have a relationship such that S3>S1. When the relationship of the cross-sectional area S3 of the downstream-space channel 78 and the cross-sectional area 51 of the lead-out port 68e is such that S3<S1, the cross-sectional area S3 of the downstream-space channel 78 decreases. The downstream-space channel 78, as previously described, is the channel formed by the interval between the resonator 68 and the air-cleaning case 61. The air in the downstream-space channel 78 could therefore have difficulty in flowing stably in cases where the cross-sectional area S3 of the downstream-space channel 78 is kept small.

Stably driving the engine 16 may therefore be difficult, and intake noise may increase. The cross-sectional area S3 of the downstream-space channel 78 is accordingly kept large, where the relationship between the cross-sectional area S3 of the downstream-space channel 78 and the cross-sectional area S1 of the lead-out port 68e is such that S3>S1. The intake noise of the engine 16 can thereby be more favorably reduced (minimized).

As described above, the cross-sectional area S1 of the lead-out port 68e, the cross-sectional area S2 of the introduction port 68d, and the cross-sectional area S3 of the downstream-space channel 78 have a relationship such that S3>S1>S2. Making the cross-sectional area S3 of the downstream-space channel 78 large thus enables the air in the downstream-space channel 78 can flow stably. The engine 16 can therefore by stably driven, and intake noise can be reduced.

The cross-sectional area S1 of the lead-out port 68e and the cross-sectional area S2 of the introduction port 68d are made to have a relationship such that S1>S2, whereby the throttle valve 47 thereby tends to be open, and the engine 16 can be efficiently driven. The cross-sectional area S2 of the introduction port 68d is kept small, whereby the intake noise of the engine 16 can be more favorably reduced or minimized.

Forming the downstream-space channel 78 between the resonator 68 and the air-cleaning case 61 thus enables air that has been led through the second air filter 66 to the downstream space 77 to be led to the downstream-space channel 78 between the resonator 68 and the air-cleaning case 61. The air that has been led to the downstream-space channel 78 is led through the downstream-space channel 78 to the introduction port 68d. The air that has been led to the introduction port 68d is led through the introduction port 68d to the internal space 69 of the resonator 68. The air that has been led to the internal space 69 of the resonator 68 is led through the internal space 69 and through the lead-out port 68e to the introduction line 74 of the intake system 41.

An example of using the resonator 68 of the air-cleaning device 45 to minimize intake noise will be described next on the basis of FIGS. 11A, 11B, and 12.

Figure 11A:
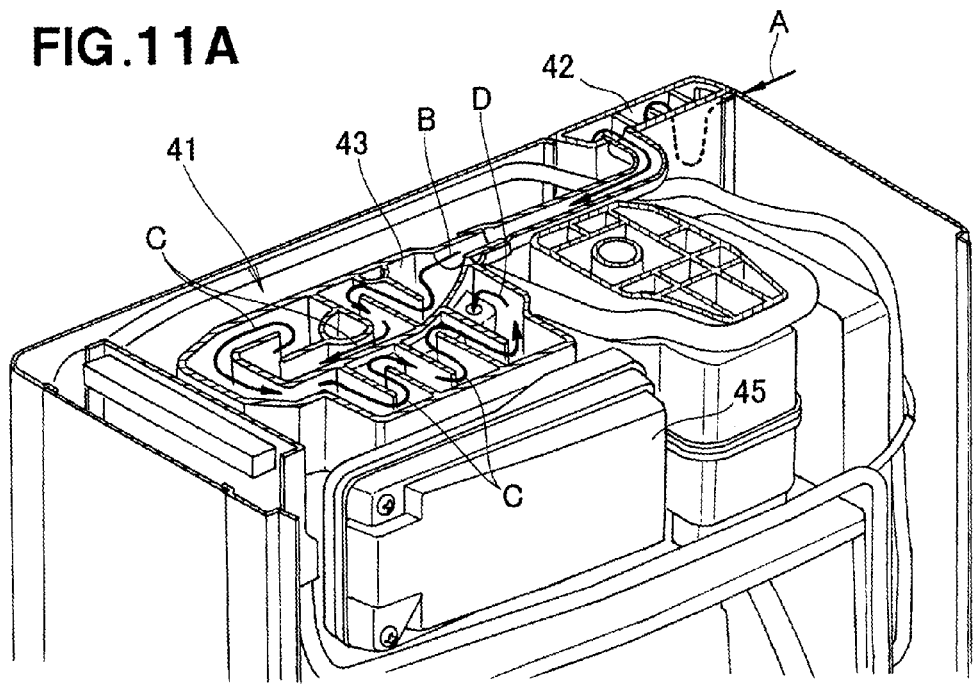
FIGS. 11A and 11B are schematic views illustrating air being introduced into the air-cleaning device according to the inventive embodiment.

As shown in FIG. 11A, outside air (air) from the air-intake part 42 of the intake system 41 is taken in as shown by the arrow A. The air that is taken in from the air-intake part 42 is led to the labyrinthine first air-introducing channel 43 as shown by the arrow B. The air that has been led to the first air-introducing channel 43 is led along the first air-introducing channel 43 as shown by the arrow C. The air that has passed through first air-introducing channel 43 is led toward the second air-introducing channel 44 (FIG. 11B) as shown by the arrow D.

Figure 11B:
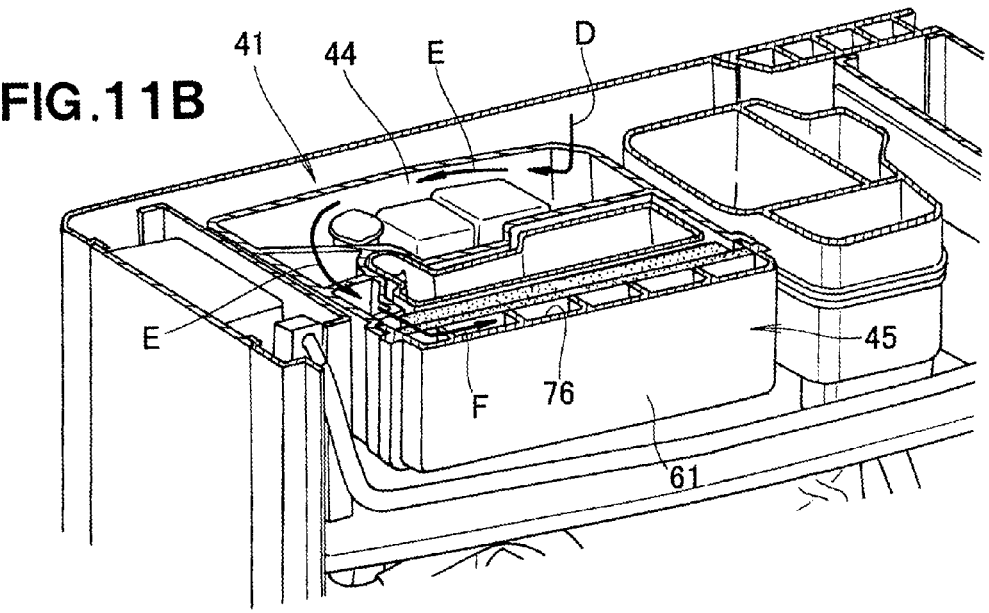

As shown in FIG. 11B, the air that has been led to the second air-introducing channel 44 as shown by the arrow D is led along the second air-introducing channel 44 as shown by the arrow E. The air that has passed through the second air-introducing channel 44 is led to the upstream space 76 of the air-cleaning case 61 as shown by the arrow F.

Figure 12:
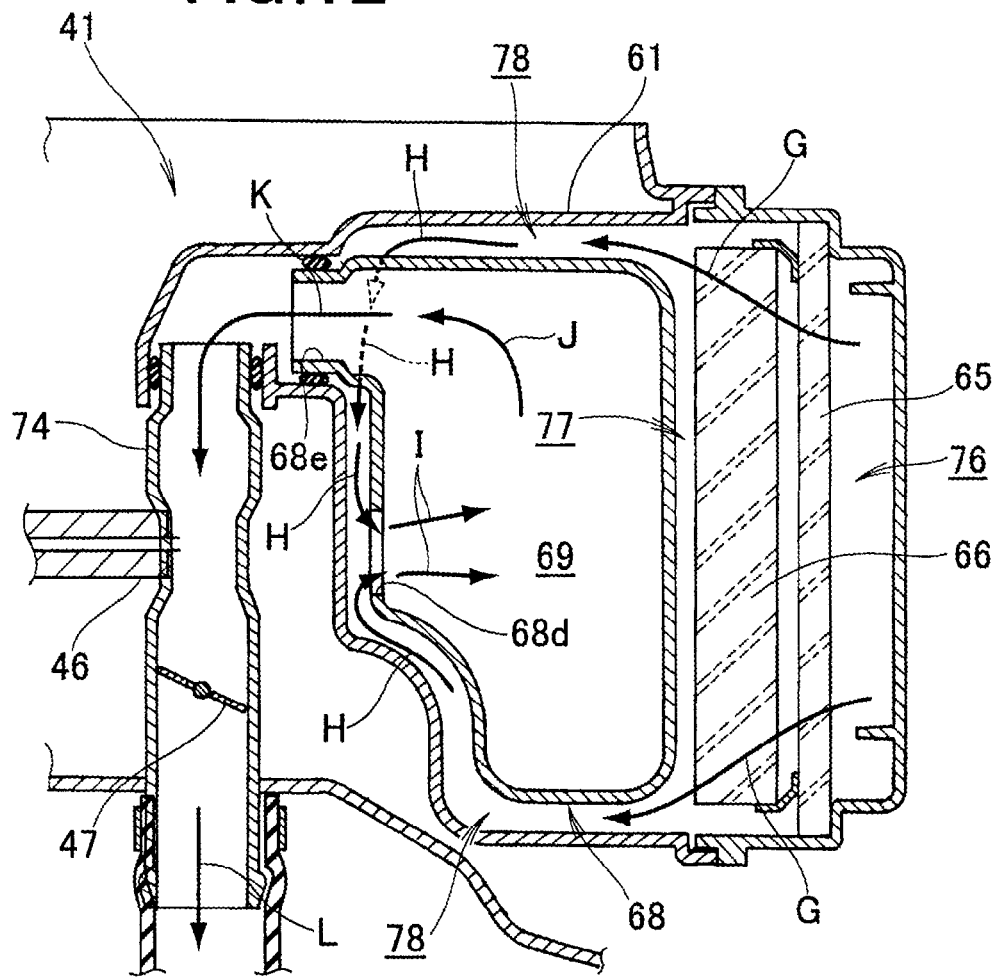
FIG. 12 is a cross-sectional view illustrating intake noise being minimized by a resonator of the air-cleaning device according to the present embodiment.

As shown in FIG. 12, the air that has been led to the upstream space 76 is purified by the first air filter 65 and the second air filter 66 and is led to the downstream-space channel 78 of the downstream space 77 as shown by the arrow G. The air that has been led to the downstream-space channel 78 is led along the downstream-space channel 78 to the introduction port 68d as shown by the arrow H. The air that has been led to the introduction port 68d is led through the introduction port 68d to the internal space 69 of the resonator 68 as shown by the arrow I.

The air that has been led to the internal space 69 of the resonator 68 is led through the internal space 69 to the lead-out port 68e as shown by the arrow J. The air that has been led to the lead-out port 68e is led through the lead-out port 68e to the introduction line 74 as shown by the arrow K. The air that has been led to the introduction line 74 is mixed with fuel gas by the mixer 46. The mixed fuel gas is led through the throttle valve 47 to the combustion chamber 17a of the engine 16 shown in FIG. 4, as shown by the arrow L.

Having the air led to the downstream-space channel 78 of the resonator 68 thus enables the intake noise of the engine 16 that is produced accompanying intake pulsations and shock waves to be reduced (minimized) by the downstream-space channel 78.

As shown in FIG. 8, the downstream-space channel 78 is maintained along the upper outside wall 68a, the lower outside wall 68b, and the rear outside wall 68c of the resonator 68, whereby the intake noise of the engine 16 that is produced accompanying intake pulsations and shock waves can be reduced (minimized) even more favorably by the downstream-space channel 78.

The introduction port 68d of the resonator 68 is provided on the side opposite (far from) the second air filter 66, whereby the intake noise of the engine 16 that is produced accompanying intake pulsations and shock waves can be led through the internal space 69 of the resonator 68 and then to the downstream-space channel 78. The intake noise of the engine 16 can thereby be minimized by the resonator 68 and then further minimized by the downstream-space channel 78, and therefore the intake noise of the engine 16 can be even more favorably reduced (minimized).

An example of attaching and detaching and an example of maintaining and checking the first control part 21, the power converter part 22, and other electronic components will be described next on the basis of FIGS. 13A and 13B.

As shown in FIG. 13A, the first control part 21, the power converter part 22, and other electronic components are provided to the electrical-equipment compartment 13.

The internal fuel line 24 must usually be removed when attaching and detaching or when maintaining and checking the first control part 21, the power converter part 22, or other electronic components.

However, removing the internal fuel line 24 requires significant labor when the internal fuel line 24 is disposed toward the interior of the cogeneration case 11 (FIG. 3), i.e., toward the center of the first control part 21, the power converter part 22, and other electronic components. Attaching and detaching or maintaining and checking the first control part 21, the power converter part 22, or other electronic components therefore requires significant labor.

The concave part 55 is accordingly formed adjoining the rear panel 32 (FIG. 3) of the cogeneration case 11, and the internal fuel line 24 is provided to the concave part 55. The internal fuel line 24 can therefore be readily removed without requiring significant labor, as shown in FIG. 13B. Attaching and detaching or maintaining and checking the first control part 21, the power converter part 22, or other electronic components can thereby be accomplished without significant labor. The ease of assembly and maintainability (maintenance and suitability for inspection) of the cogeneration apparatus 10 can therefore be improved.

The cogeneration apparatus according to the present invention is not limited to the previously described embodiment; appropriate changes, improvements, and the like are possible. For example, the gas engine 16 was given as the motor in the embodiment, but this example is not given by way of limitation, and a gasoline engine or other engine can also be used.

The shapes and configurations of the cogeneration apparatus 10, the engine 11, the electrical generator 18, the heat exchanger 19, the intake system 41, the air-cleaning device 45, the throttle valve 47, the air-cleaning case 61, the second air filter 66, the resonator 68, the introduction port 68d, the lead-out port 68e, the internal space 69, the upstream space 76, the downstream space 77, the downstream-space channel 78, and the like given in the embodiment are not limited to the examples given; appropriate changes are possible.

The present invention is suitably applied to cogeneration apparatuses that are provided with an electrical generator driven by a motor, and with a heat exchanger that uses waste heat of the motor, in which an air-cleaning device is provided to the motor.

Obviously, various minor changes and modifications of the present invention are possible in light of the above teaching. It is therefore to be understood that within the scope of the appended claims the invention may be practiced otherwise than as specifically described.

What is claimed is:

1. A cogeneration apparatus comprising:
   a motor;
   a fuel line for leading fuel to the motor;
   a control part for controlling the motor;
   an electrical generator driven by the motor;
   a power converter part for converting alternating-current power generated by the electrical generator to electrical power of required specification;
   a heat exchanger for using waste heat of the motor as a heat source; and
   a housing for accommodating the motor, the fuel line, the control part, the electrical generator, the power converter part, and the heat exchanger,
   wherein the housing is partitioned into a power-generation compartment and an electrical-equipment compartment by a dividing wall,
   the motor, the electrical generator, and the heat exchanger being accommodated in the power-generation compartment, while the control part, the power converter part, and the fuel line being accommodated in the electrical-equipment compartment, the dividing wall includes a bent portion that is bent toward the power generation compartment to form an empty space in the electrical-equipment compartment, and the fuel line is disposed in the empty space formed by the bent portion.

2. The apparatus of claim 1, wherein the empty space is provided adjacent to a wall surface of the housing.

3. The apparatus of claim 1, wherein the empty space is formed to have a substantially triangular shape as viewed from above.

\* \* \* \* \*